March 12, 1968  J. M. WAGNER  3,373,358
PANTOGRAPH PROBE SYSTEM FOR TESTING ELECTRICAL CIRCUITS
Filed April 30, 1964  2 Sheets-Sheet 1

INVENTOR.
JOHN M. WAGNER
BY Thomas J. Nikolai
ATTORNEY

March 12, 1968  J. M. WAGNER  3,373,358
PANTOGRAPH PROBE SYSTEM FOR TESTING ELECTRICAL CIRCUITS
Filed April 30, 1964  2 Sheets-Sheet 2

INVENTOR.
JOHN M. WAGNER
BY Thomas J Nikolai
ATTORNEY

United States Patent Office 3,373,358
Patented Mar. 12, 1968

3,373,358
PANTOGRAPH PROBE SYSTEM FOR TESTING
ELECTRICAL CIRCUITS
John M. Wagner, Minneapolis, Minn., assignor to Sperry
Rand Corporation, New York, N.Y., a corporation of
Delaware
Filed Apr. 30, 1964, Ser. No. 363,893
2 Claims (Cl. 324—72.5)

ABSTRACT OF THE DISCLOSURE

A device for testing electrical circuits which includes a pair of independently movable pantographic devices each having a long arm and a needle arm. Each long arm has a test probe end, and each needle arm has a contact point end. A master template having a plurality of reference points thereon is positioned under the test probe end and an electrical circuit to be tested is positioned under the contact point end. The electrical circuit to be tested has a plurality of test points corresponding to at least a like plurality of the reference points on said template whereby the contact points are positioned above the selected test points as determined by the positions of the test probes with respect to the reference points on said template. When the proper positions are obtained, a switch mounted on at least one of the pantographic devices is actuated which energizes a solenoid mounted on each of the devices. Each solenoid has an extended armature connected to a respective contact point whereby, when the switch is actuated, the solenoids cause the contact points to engage the test points located thereunder. Appropriate meters or lights connected to the contact points indicate the condition of the circuit under test.

The present invention relates to electrical test apparatus and particularly to an electromechanical device comprising a pantograph-like construction for permitting the accurate positioning of test probes between test points of electrical circuitry in order to detect discontinuities therein or short circuits from one conductor to another.

More importantly still the invention is characterized by a symmetrical arrangement of arms including independently positionable pantographic arms for tracing out a circuit technique on an overlay superimposed over a master template. The independently movable pantographs produce small, precise movements from large movements in such a manner so as to position movable contact needle points precisely arranged in such a fashion that, once positioned horizontally, are forced vertically down under predetermined force to ensure good contact, yet, prevent damage to the micro-circuit board being tested.

Recent trends in modern printed circuit technology have emphasized miniature circuit cards or boards. Conventionally, circuit continuity was tested by using two needle probes under a microscope resulting in a tedious, uneconomical, and slow procedure resulting in errors and damage to the contact needle probes. Furthermore, the accurate placing of two probes on the selected test points is normally a difficult procedure and is frequently destructive of the circuit being tested due to the extremely small size of the circuit pattern itself and therein the inherent close spacing of the test points.

The above-mentioned limitations associated with continuity checking of printed circuitry indicates the desirability of utilizing an electromechanical device for determining continuity of printed circuits whereby an operator may position the "large" ends of a pantographic device on an enlarged template of a miniature circuit and by inherent action will translate this motion into a much reduced movement at the "small" end thereby making it much easier for the operator to do an accurate job.

Conventional devices of the pantograph type are demonstrated by the Patents 548,327 and 2,027,529. However, in both, neither of the pantograph arms is independently movable of the other. In the former, each arm moves in correspondence with the other through the use of a pinion and a gear sector arrangement while in the latter interconnected tapes necessitate synonymous movement of both arms. A unique advantage of the instant invention is derived from a construction permitting independent relative movement of the pantographic arms. This is particularly important to the function of the apparatus since it allows any desired movement over the entire master template and overlay for continuity checking of microcircuit elements.

It is therefore one of the primary objects of the invention to provide apparatus for facilitating the electrical testing of miniaturized printed circuits.

It is an additional primary object for enabling an operator to accurately locate electrical test probes at predetermined test points of the printed circuit.

It is a further object of the invention to provide apparatus having independently movable linkages to facilitate the testing of printed circuits.

Another object of the invention is to provide an improved device of the character described which is sturdy in construction, economical to produce, and precise in operation.

These and other more detailed and specific objects will be disclosed in the course of the following specification.

The test apparatus consists of a symmetrical linkage arrangement translatable about a common pivot point. Since each half of the apparatus is structurally synonymous with respect to the other, only one half need be explained in detail by way of reference to the appended figures.

Figure 1:
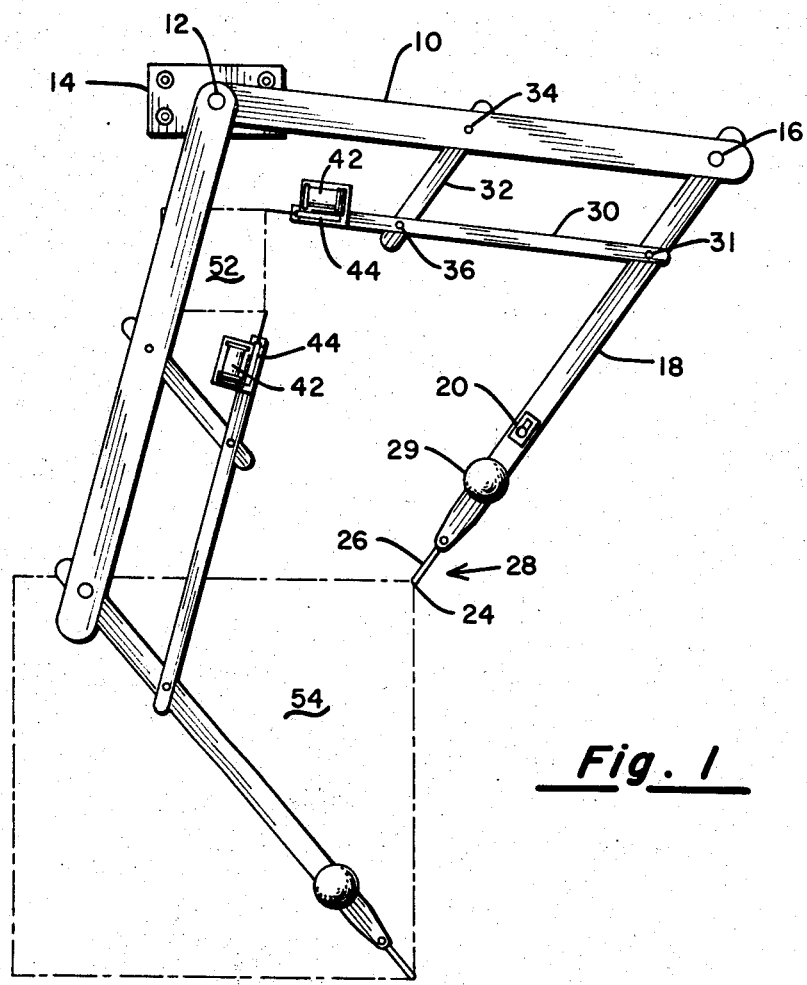
FIG. 1 is a top view in perspective of a preferred embodiment of the invention.

Referring in detail to the drawings and more particularly to FIG. 1, the right pantographic arrangement comprises a primary arm 10 having one end pivotably mounted at 12 to a base plate or table 14 which may be fastened to a support or work table by any suitable means. The other end shares a common pivot 16 which also mounts the secondary long arm 18. At the free end of the secondary long arm 18 there is located a microswitch 20 and a test probe 28. Long arm 18 may be manipulated by suitable handle or knob means 29. The test probe 28 consists of a supporting member 26 for a ball or some point 24 located on its extremity.

Extending parallel to primary arm 10 is the needle arm 30 pivotably mounted at 31 at its right end to secondary long arm 18. Extending parallel to arm 18 is a minor arm 32 pivotally connected to primary arm 10 and needle arm 30 at 34 and 36, respectively. As is evident from FIG. 1, the enclosed geometrical arrangement forms a parallelogram such that regardless of the position of secondary long arm 18, the enclosed arms always form a parallelogram. As seen in the figure, needle arm 30 terminates with an insulator 38 secured to the needle arm 30.

Figure 2:
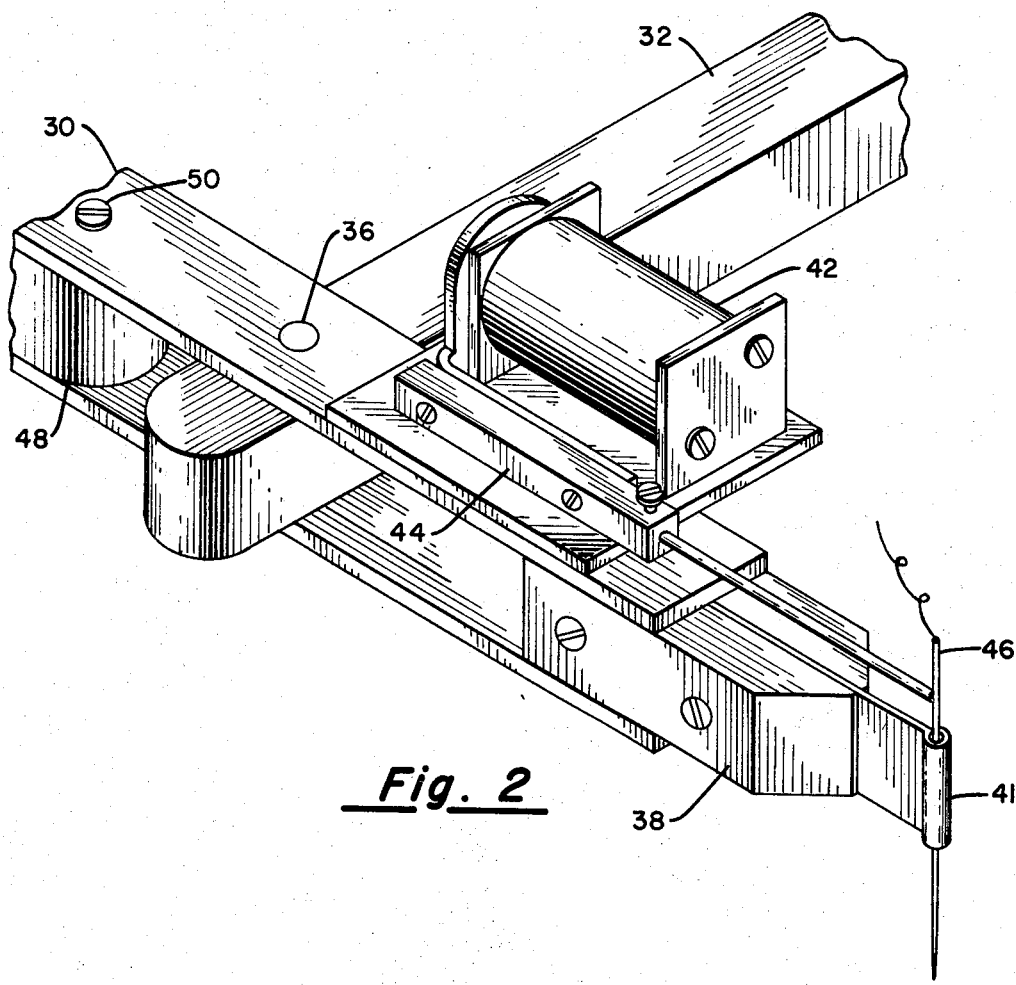
FIG. 2 is a view in perspective of a portion of the linkage shown in FIG. 1.

A solenoid 42 mounted in any suitable manner to needle arm 30 includes a flexible insulator actuator arm 44 fixedly securing the other end of contact point 46. Sufficient flexibility of the extension arm 44 is permitted to prevent damaging of the board by the contact points. As observed in FIG. 2 contact point 46 is maintained in a vertical position by being fixedly secured to the flexible actuator arm 44 and restrained in the transverse direction by a guide element 41, the manner of securing and guiding the contact point 46 being only illustrative rather than being limited to that arrangement shown. The contact point may also be spring biased (not shown) so as to reduce shock impact to the contact point and the element being tested. Upon energization of solenoid 42 the extension arm 44 moves downward causing a vertically downward movement of the contact point 46 through the guide 41. It is not intended that mounting of the solenoid be limited to the needle arm 30 since it could as well be mounted on another arm to the left of and parallel to minor arm 32. The instant structural arrangement is illustrative only and not intended to be all inclusive. As seen from FIG. 1, the solenoid will always remain in the same relative position to the needle, regardless of where the long arm 18 of the pantograph may be moved. The same position must be maintained to ensure that the needle will be plunged vertically down.

Figure 3:
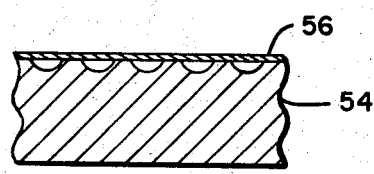
FIG. 3 is a sectional side view showing the master template and overlay.

To provide requisite strength and rigidity to the primary arm 10 and the secondary long arm 18, the members may be constructed of dual elements separated by spacer element 48 as clearly seen in FIG. 3. The spacers are maintained in position with the two elements by fastening, for example with screws 50. Many other methods of attachment such as by rivets, bonding, could also be utilized. It is not intended that structural characteristics of the arms be limited to the dual arm arrangement. For example, the arms could as well physicall resemble a T-shaped rib configuration or any other well-known design. Aluminum construction of all the arms is utilized because of its inherent characteristics of lightness and rigidity.

A printed micro-circuit board 52 to be tested is positioned by aligning it under the needle 46, in any suitable manner. An enlarged master circuit template 54, corresponding to the micro-circuit board, is provided with a plurality of recesses arranged in accordance with a predetermined pattern corresponding to the pattern described on the micro-circuit board. The recesses in the master template 54 may be drilled, formed, or photo-etched, for example. Now referring to FIG. 1 in particular, it can be seen that the position of needle 46 over the micro-circuit board 52 corresponds exactly to the position of the test probe 28 over the master template 54. As is evident from the figure, the geometrical characteristics of the pantographic device are such that a large movement of the long arm 18 produces a small movement of the minor arm 32. These movements are identical in direction and are reduced a proportionate amount, depending upon the ratio of the minor arm length to the long arm length. The needle 46 will thus be properly aligned over the micro-circuit board in correspondence with the position of the test probe 28. An enlarged master circuit copy overlay 56 containing circuit information and corresponding in size to the master template 54 is located in a predetermined position directly over the master template. The overlay may take the form of an opaque paper sheet having described on the surface a visible drawing of the circuit to be tested corresponding exactly with the circuit pattern on the micro-circuit board 52. The overlay copy may be secured by a suitable means to the master template such as by clamp springs for example. The weight of the long arm 18 on the ball 24 of test probe 28 forces the ball into the recesses of the master template and consequently perforates the overlay copy 56 producing a record of the particular circuits tested by the apparatus.

It is also evident that the overlay copy 56 need not be limited to an opaque sheet. A transparent overlay in conjunction with a marking device (not shown) on the test probe 28 could be utilized to trace an inked circuit pattern being tested. By analysis of the inked overlay record, it can be determined which circuit patterns were checked.

In the operation of the pantograph testing device the micro-circuit board is positioned on the pantograph base adjacent the contact points in any suitable manner. The four corner points of the circuit board must correspond to the four corner points of master-template to assure proper alignment of the board with the contact points. The enlarged overlay containing the circuitry pattern to be tested is located in a predetermined position over the master template. By moving the pantographic arms point to point on the overlay the entire circuit may be checked out. As the long arms are placed in test positions over the recesses and on the overlay test points the weight of the arm pressing the ball into the master template recess causes a perforated record to be made of the particular circuit checked. Simultaneously with the positioning of the long arms on two holes of the master template, the contact point on the needle arms move to corresponding holes on the micro-circuit board. When in test position the micro-switch on one of the long arms of the pantograph is closed by the operator which actuates the solenoids and causes the contact points to make contact with the micro-circuit board. If exact alignment of the micro-circuit board with the contact point cannot be achieved because of shrinkage variations, a guide provided with funnel-shaped holes may be located over the board so as to guide the contact points to make proper contact.

An ohmmeter and/or indicating lights (not shown) are connected to the needles or contact points and indicate open circuits, shorted circuits, and good circuits.

It is understood that suitable modifications may be made in the structure as disclosed provided such modifications come within the spirit and scope of the appended claims. Having now, therefore, fully described my invention, what I claim to be new and desire to protect by Letters Patent is:

1. Apparatus for testing electrical circuits comprising:
    (a) a support member,
    (b) a master template having a plurality of reference points thereon,
    (c) a shaft member secured to said support member,
    (d) a pair of independently movable pantographic devices pivotally connected to said shaft member, each of said devices having a contact point end and a test probe end, said test probe ends being disposed above said master template for selective alignment of said test probes with the reference points thereon, said contact point ends each having a contact point movably secured thereto, and
    (e) an electrical circuit holding means mounted on said support under said contact points whereby an electrical circuit having a plurality of test points corresponding to at least a like plurality of said reference points on said template may be mounted therein, said contact points making electrical contact with selected ones of said test points as determined by the positions of said test probes with respect to said reference points on said master template.

2. Apparatus as in claim 1 further including:
    (a) a solenoid mounted on each of said devices, each solenoid having an extended armature connected to a respective contact point whereby actuation of said solenoid causes said contact point to engage any test point which may be located thereunder, and
    (b) a switch mounted on at least one of said devices and being electrically connected to said solenoids whereby actuation of said switch element energizes said solenoids.

References Cited

UNITED STATES PATENTS

| | | | |
|---|---|---|---|
| 2,504,334 | 4/1950 | Iams | 324—72.5 |
| 2,844,250 | 7/1958 | Bayha | 324—73 XR |
| 3,137,815 | 6/1964 | Hershey | 324—158 |
| 3,160,956 | 12/1964 | Mercorelli | 33—25 |
| 3,264,556 | 8/1966 | Krantz | 324—158 XR |

RUDOLPH V. ROLINEC, *Primary Examiner.*

E. L. STOLARUN, *Assistant Examiner.*